United States Patent [19]

Lamare et al.

[11] 4,281,291

[45] Jul. 28, 1981

[54] ARRANGEMENT FOR DETECTING THE BINARY VALUES OF BIT CELLS HAVING CENTER TRANSITIONS SUBJECT TO PHASE DISTORTION

[75] Inventors: Jean-Claude Lamare, Ezanville; Christian Maury, Velizy, both of France

[73] Assignee: Compagnie Internationale pour l'Informatique-CII Honeywell Bull, Paris, France

[21] Appl. No.: 964,724

[22] Filed: Nov. 29, 1978

[30] Foreign Application Priority Data

Dec. 12, 1977 [FR] France .............................. 77 37290

[51] Int. Cl.$^3$ .......................... H03K 9/00; G11B 5/06
[52] U.S. Cl. ..................................... 329/50; 329/104; 360/42; 360/29
[58] Field of Search .................. 329/50, 104, 106, 107; 325/321; 360/28, 29, 40, 41, 42; 375/25, 94

[56] References Cited

U.S. PATENT DOCUMENTS

| | | | |
|---|---|---|---|
| 3,699,554 | 10/1972 | Jones | 360/43 |
| 3,789,207 | 1/1974 | Jones | 360/40 |
| 3,818,501 | 6/1974 | Fiorino | 360/40 |
| 3,864,583 | 2/1975 | Fiorino | 329/50 X |
| 3,877,027 | 4/1975 | Marino | 329/50 X |

OTHER PUBLICATIONS

Ferrier, Jr. et al., "Item Identifying Asymmetrical Coding," IBM Technical Disclosure Bulletin, vol. 14, No. 4, Sep. 1971, pp. 1286-1287.
J. S. Swartz, "High-Speed VFO and Data Separator," IBM Technical Disclosure Bulletin, vol. 13, No. 1, Jun. 1970, pp. 117-118.

*Primary Examiner*—Siegfried H. Grimm
*Assistant Examiner*—Edward P. Westin
*Attorney, Agent, or Firm*—Lowe, King, Price & Becker

[57] ABSTRACT

Data, in the form of a sequence of binary bits of frequency $F_O$, is detected by deriving a clock signal H of frequency $F_O$ in response to the sequence. A level transposing device responsive to the sequence and signal H derives a bi-level signal DEI. An integrating apparatus responds to DEI to derive a signal DEINT. A decision circuit responsive to DEINT determines the polarity of signal DEINT and derives binary data bits having values that are a function of the polarity. The direction and duration of charging current supplied to a pair of capacitors of the integrator are controlled as a function of the polarity and duration of each of the levels of signal DEI, so the capacitors are respectively charged in response to even and odd numbered bits. The integrator is reset to zero at the end of the integrating operation for each level and the capacitive integrating member is supplied with a charging current proportional to $F_O$. The voltages across the integrators are compared, by subtracting, during each bit. The polarity of the integrated difference determines the bit value, while the presence of a phase error is determined by comparing the integrated difference with a reference to derive a pair of signals indicating the polarity of the reference relative to the differences and the complement of the difference. If the difference and its complement have the same polarity relative to the reference, a phase error exists.

10 Claims, 7 Drawing Figures

FIG. 6
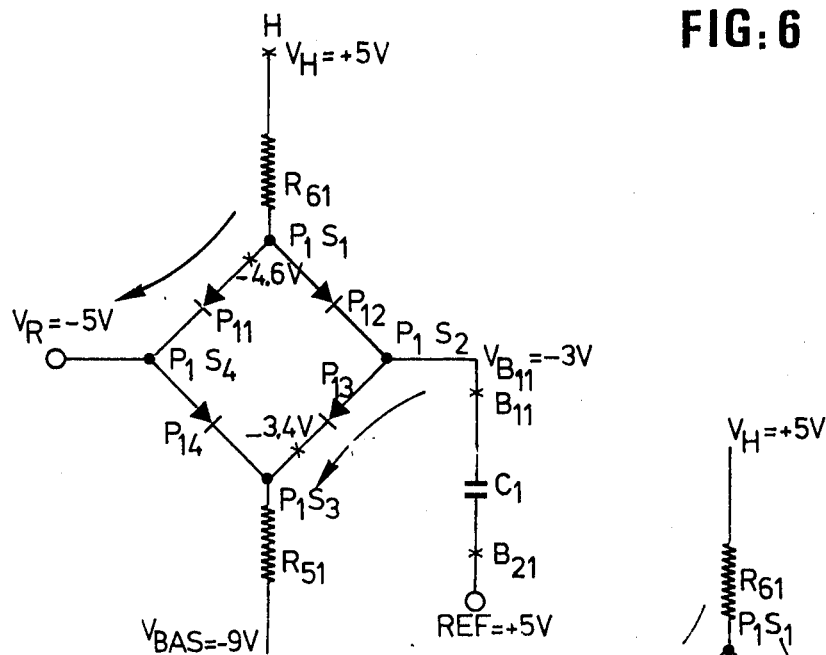
FIG. 6A
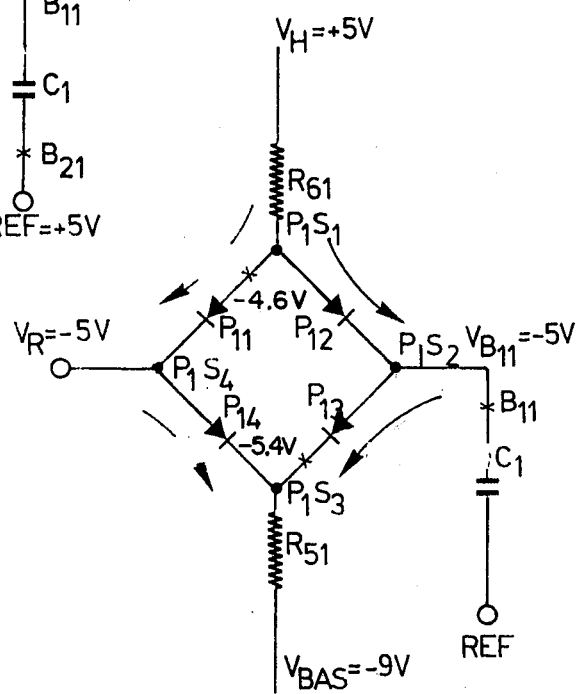
FIG. 6B
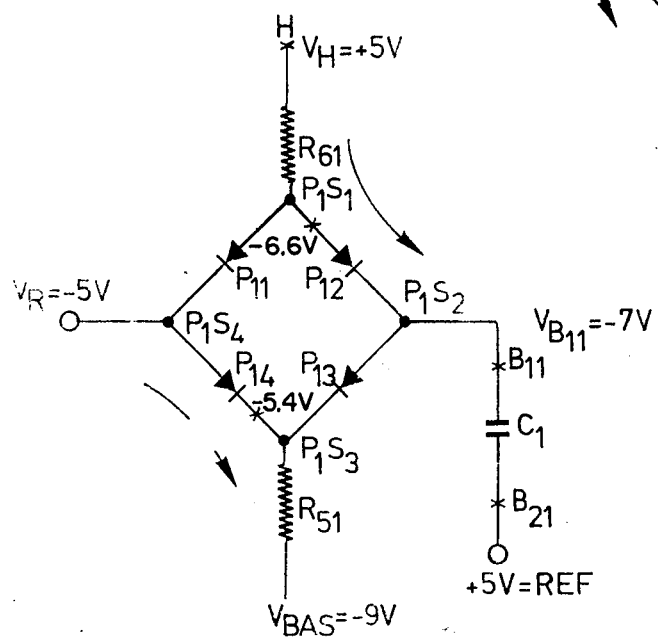
FIG. 6C

ARRANGEMENT FOR DETECTING THE BINARY VALUES OF BIT CELLS HAVING CENTER TRANSITIONS SUBJECT TO PHASE DISTORTION

FIELD OF INVENTION

The present invention relates to an apparatus for detecting a series of electrical signals having center transitions with polarities that determine the value of a binary value of a bit.

While the present invention is described in connection with an apparatus for detecting data recorded on a magnetic tape of a magnetic tape deck, it is clear that the description is equally applicable to any appropriate electric signal detecting apparatus.

BACKGROUND OF THE INVENTION

In present day data-processing systems, magnetic tape decks are commonly used because they have large storage capacity, and require relatively short times for magnetic read/write heads to access data contained anywhere on the magnetic recording tapes from the moment when the heads receive a data access command from the processing system. Magnetic tapes carry data, in coded (usually binary) form, on parallel recording tracks (usually nine) having widths that do not exceed a few hundredths of a millimeter. It is current practice for tape decks to carry only a single removable magnetic tape which is replaced by another tape as soon as reading and/or writing operations involving the first tape have been completed.

Each read-out track of a tape has associated with it a read/write head which is positioned very close to, or even in contact with, the track. The tape moves discontinuously past an assembly formed by the heads for all of the recording tracks. The discontinuous movement is a sequence of "unitary movements", each comprising: (a) a tape speed up phase, during which the tape has a high acceleration; (b) a phase during which the tape moves at a substantially constant speed $V_O$, and (c) a braking phase during which the tape has a high deceleration until it is completely stopped. It is current practice for the data to be read, during each "unitary movement", after the speed up phase, while the tape is moving at constant speed $V_O$.

What are termed slow variations in the tape speed are speed variations about speed $V_O$ which take place while the data are read. Frequently these variations are ±25% of the speed $V_O$ and sometimes as great as ±50% of $V_O$. The duration of these variations is a few fractions of a millisecond. Instantaneous variations in the tape speed, on the other hand, are speed variations having durations approximately a hundred to a thousand times shorter than that of the slow variations.

When binary data bits recorded on a magnetic tape pass by an assembly of magnetic read/write heads associated with all of the recording tracks, each of the heads derives a series of analogue electric signals which are shaped into a series of square-wave electrical pulses by shaping circuits. The pulse voltage varies between minimum and maximum values $V_{min}$ and $V_{max}$. For ease of exposition, a description will be given only to the signals derived by a single head; it is to be understood that the same description is equally applicable to the signals derived by the other heads. The leading edge of the electrical pulse is that part of the pulse during which the voltage changes from the value $V_{min}$ to the value $V_{max}$. Oppositely, the trailing edge of a pulse is that part of the pulse during which the voltage changes from the value $V_{max}$ to the value $V_{min}$. The binary codes most frequently used to indicate data on magnetic tapes are such that, after the signals have been read and shaped, a bit equal to "logic one" corresponds to a leading or positive going edge of a pulse while a bit equal to "logic zero" corresponds to the trailing or negative going edge of a pulse.

The series of transduced square-wave electrical pulses constitutes a substantially cyclic signal DE having a nominal means frequency $F_O$ and period $T_O$; hence, $T_O$ defines a single signal bit or "bit cell period". It is clear that the frequency $F_O$ of the transduced signal is proportional to the tape speed. Hence, the higher the tape speed, the greater the number of data items read by the magnetic head per unit of time, whereby frequency $F_O$ corresponds to speed $V_O$. For any variation in the tape speed there is a corresponding frequency variation. Thus for a slow tape speed variation there is a corresponding low frequency and for an instantaneous speed variation there is a corresponding instantaneous frequency variation.

If $t_0$ is the time at which a given 'bit cell' begins, the time $(t_0+T_0/2)$ is termed the "center of the bit cell" and the time $(t_0+T_0)$ is termed the "end of the bit cell". Each cell contains either a leading or trailing pulse edge situated in the center of the cell, and possibly, a leading or trailing edge at the end of the cell. Only rising or decaying edges situated in the center of "bit cells" are considered to represent bit values.

Signal DE is similarly defined as being formed by a sequence of a first set of even bit cells $CB_O$, $CB_2$, $CB_4$, $CB_i$... $CB_{2n}$ interleaved with a sequence of a second set of odd bit cells $CB_1$, $CB_3$, $CB_j$... $CB_{2n+1}$, where n is a hole number.

The transduced signal DE is supplied to an apparatus for detecting the data recorded on the magnetic tape of the tape deck. Such a detecting apparatus determines the value of each of the data bits recorded on magnetic tape and operates in three phases. During phase one, all the leading or trailing pulse edges in the center of each cell bit of signal DE are recognized to determine the value of the data bits. During phase two, each of the recognized edges is converted into a signal having an amplitude that remains constant during the period $T_0$ of this cell. A leading edge is converted into a signal of constant positive amplitude which is termed a "high level", whereas a trailing edge is converted into a signal of constant negative amplitude which is termed a "low level". The positive and negative amplitude signals are referred to collectively by the name "signal DEI". During phase three, the value of the bit corresponding to each cell is determined from signal DEI during each period $T_O$. High and low levels respectively correspond to bit values of one or zero.

Imperfections in the magnetic tape and magnetic reading heads, as well as slow and instantaneous tape speed variations, cause distortion in both the amplitude and the phase of the signals read by the head, so that the signal amplitude is reduced and is phase shifted. The distortion is increased by the electronic shaping circuits and the data detecting apparatus and is manifested as a shift in the time position of the edges at the beginning or center of the bit cell. It can further be shown that the distortion increases as the density of the data recorded on the magnetic tape increases, that is, as the number of data items recorded per unit of length of the magnetic tape increases. The phase and amplitude distortion of signals DE and DEI may be relatively severe.

In the prior art there are simple and effective magnetic tape data-detecting devices which enable data bits to be detected with very great accuracy despite considerable phase and amplitude distortion in the signal DEI. Such an arrangement comprises an electric clock circuit which is synchronized by signal DE to derive a clock signal H of the same frequency as signal DE. A level transposition device responds to signals DE and H to perform phases 1 and 2 described supra, and transmit a signal DEI to an integrating apparatus which preferably comprises first and second capacitive integrators each of which is associated with a zero reset circuit. The first and second integrators also respond to signal H so that the first integrator integrates each of the high and low levels of signal DEI during each even bit cell period $T_0$ and is reset to zero by the zero reset circuit associated with it during each of the odd bit cell periods $T_0$. The second integrator integrates each of the high and low levels of signal DEI during period $T_0$ of each odd bit cell and is reset to zero by the zero reset circuit associated with it during each of the even bit cell periods $T_0$. During each integrating period $T_0$, the integrating apparatus performs one integration, whereby period $T_0$ is termed an integrating period.

By definition, "resetting an integrator to zero" is a term arbitrarily used for an operation which involves returning the integrator to an initial rest state where the integrator output remains constant over a time interval; this term is used even though the voltage at neither of the terminals of the capacitive integrating member equals zero.

The integrating arrangement derives a signal DEINT which is coupled to a decision circuit which determines the polarity of signal DEINT at the end of each bit cell period $T_0$. If the polarity is positive or negative, the corresponding bit is equal to one or zero.

If it is desired to detect, by integration, signals having frequencies lower than the frequencies of the signals read from tape decks or other memories involving magnetic recording media, or if the loss of time due to resetting the integrators to zero does not have an adverse effect on the detection accuracy, it is possible to use an integrating apparatus having only a single integrator containing a capacitive integrating member.

Simple, reliable and inexpensive integrating devices which integrate with a high degree of precision are known. Such a device is described for example in co-pending U.S. patent application, Ser. No. 959,097, entitled "Apparatus for and Method of Integrating a Series of Electric Signals", filed by the present applicants on Nov. 9, 1978, now U.S. Pat. No. 4,188,620.

The integrating device disclosed in the co-pending application comprises at least one integrator containing a capacitive integrating member. Each integrator is associated with a zero reset circuit which resets the integrator to zero at the end of each integrating operation. A device for controlling the integrator receives signal DEI to be integrated and clock signal H. The control device determines the direction and duration of the charging current for the capacitive member, so that the polarity of the integrated signal DEINT at the terminals of the capacitive member is the same as that of signal DEI, and signal DEINT has a duration of period $T_0$. A current generator supplies the capacitive integrating member with a current proportional to the frequency $F_O$ of the signal DE.

Such an integrating device derives an output signal DEINT having a voltage $V_C$ that remains constant regardless of slow variations in the frequency $F_O$, which reflects the speed of a magnetic tape on a deck. Voltage $V_C$ remains at sufficient amplitude during the instantaneous variations of frequency $F_O$ to enable the polarity of signal DEINT to be determined with sufficient accuracy.

Simple and inexpensive zero reset circuits are also known. One such circuit disclosed in the previously mentioned application, comprises four diodes, preferably of the Schottky type, arranged as a bridge. A first pair of opposite bridge terminals is supplied with different constant voltages. A second pair of opposite bridge terminals are such that one of the second terminals is connected to a terminal of the capacitive member of that integrator which is associated with the zero reset circuit. The voltage at the terminal of the capacitive member varies as a function of the voltage $V_C$ (the voltage at the other terminal of the capacitive member remaining constant). The other terminal of the second terminals carries a constant reference voltage.

The integrating arrangement is reset to zero when both of the second bridge terminals are at the same potential, which balances the bridge.

BRIEF DESCRIPTION OF THE INVENTION

The present invention makes it possible to improve the accuracy, and reduce the cost, of such detecting arrangements by employing the integrating arrangement described in the previously mentioned application and by associating, preferably with the integrator which it contains, a zero reset circuit of the type described above.

In accordance with the invention, a data detecting apparatus for a sequence of electrical signals of frequency $F_O$ comprises a clock circuit synchronized by the sequence. The detecting apparatus derives a clock signal H of frequency $F_O$ and includes a level transposition device responsive to the signal sequence and a timing signal $\phi(t)$ synchronized with clock signal H. The level transportation device derives a signal DEI including a series of positive and negative levels. An integrating apparatus responds to signal DEI and derives a signal DEINT that is supplied to a decision circuit which determines the polarity of signal DEINT and derives data bits whose value is a function of this polarity. The integrating apparatus has at least one integrator including a capacitive integrating member controlled by a device responsive to signal DEI. The device controls the direction and duration of the charging current supplied to the capacitive member, as a function of the polarity and duration of the levels of signal DEI. The detecting apparatus also includes a circuit for resetting the integrator to zero after each level has been integrated, and a generator which supplies the capacitive integrating member with a charging current proportional to the frequency $F_O$.

In a preferred embodiment of the data detecting arrangement according to the convention, the integrating arrangement comprises first and second integrators. A switching apparatus connected between the current generator output and inputs of the first and second integrators comprises separate devices for controlling the first and second integrators. Separate circuits reset the first and second integrators to zero. The switching arrangement responds to the sequence of signals to be integrated and the current supplied by the current generator in such a way that the first integrator performs an integrating operation while the second integrator is reset to zero by its zero reset circuit, and vice versa.

To determine the value of each bit cell and the presence of a phase error, the signals accumulated by the integrators are subtracted, prior to integrator resetting, to derive a difference signal. The polarity of the difference signal indicates the binary value of the bit cell. The difference signal and a complement thereof are compared with a reference value. If the difference signal and the complement have the same predetermined polarity relative to the reference value, an indication of phase error for the bit cell is derived. The phase error indication can be used to signal that there is a high probability of error for the particular bit.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 6, consisting of FIGS. 6A–6C, is an illustration of the operation of the zero reset circuit shown in FIG. 5.

DETAILED DESCRIPTION OF THE DRAWING

Figure 1:
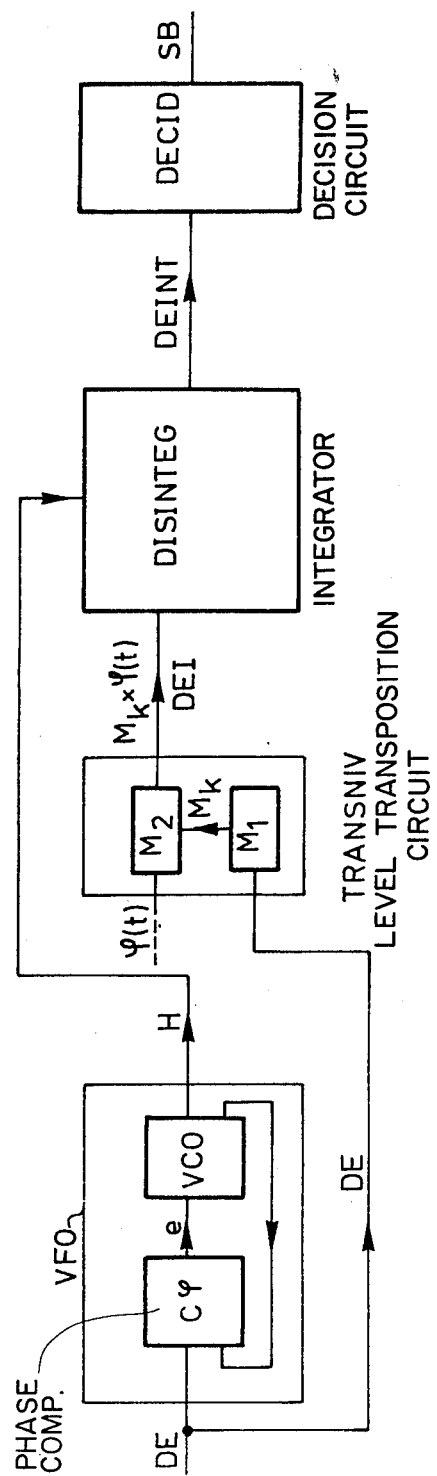
FIG. 1 is a diagram of a prior art data detecting apparatus.
Figure 2:
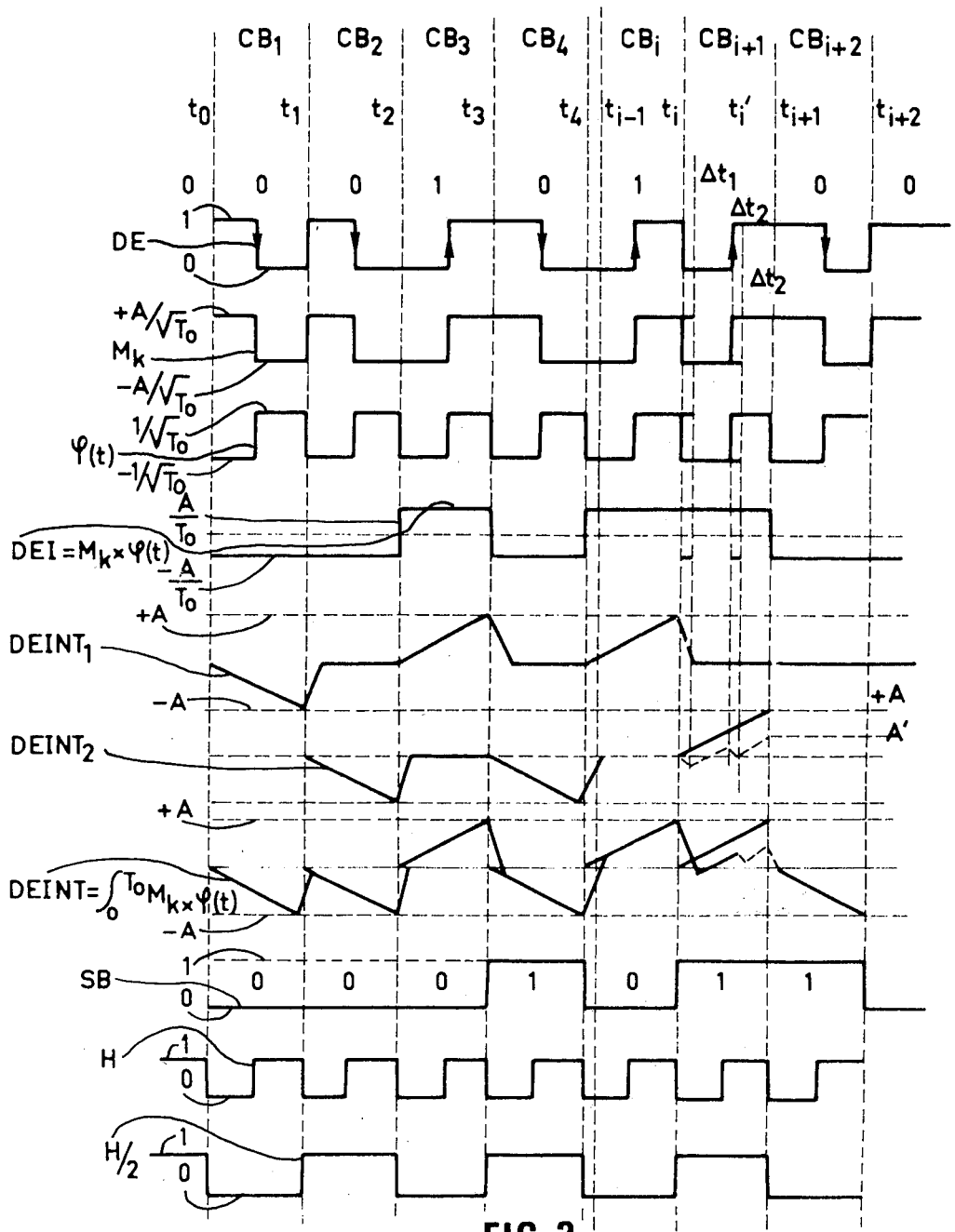
FIG. 2 is a diagram with respect to time of various signals extracted from different points in the data-detecting arrangements of FIGS. 1 and 4.
Figure 3:
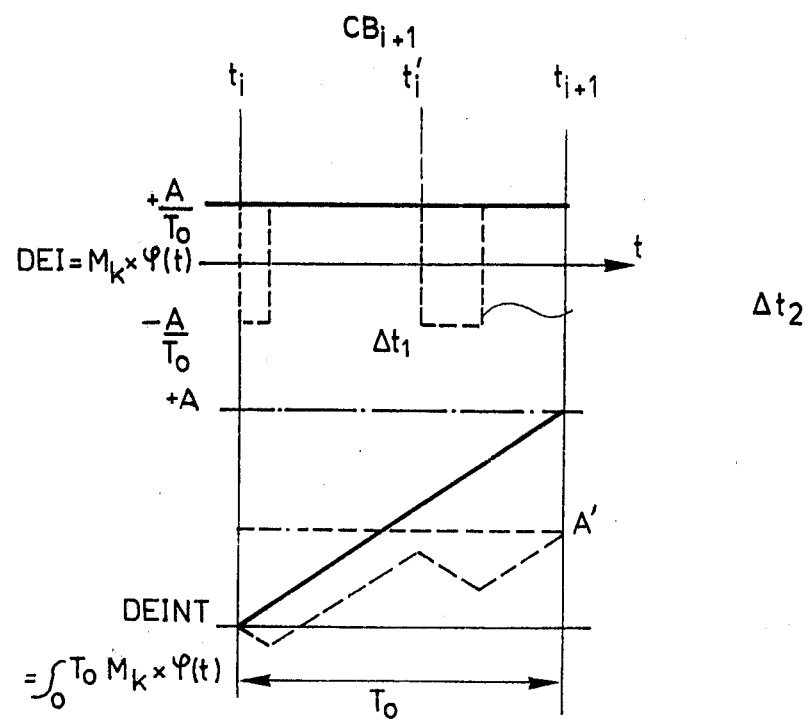
FIG. 3 are waveforms of the input and output signals of the integrating arrangement of FIG. 1 when the input signal contains phase distortion.

To better understand the construction and operating of the integrating apparatus of the invention, reference is made to FIGS. 1–3 to review a few points about the operation and construction of a prior art apparatus for detecting recorded data. The data to be detected are recorded, for example, on a magnetic tape, a tape deck, magnetic disc or any other magnetic medium forming part of a magnetic memory of a data processing system and are coupled to the detector from a magnetic head as signal DE.

The main components of the prior art detector are: a variable frequency oscillator VFO; a circuit TRANSNIV that responds to shaping circuits for input signal DE to transpose the shaped signal into output signal DEI; an apparatus DISINTEG which integrates signal DEI to derive output signal DEINT; a decision circuit DECID which determines the sign of integrated signal DEINT to determine the binary value of data bits of signal DE.

Variable frequency oscillator VFO has an input responsive to input signal DE (FIG. 2) derived by shaping circuits for a series of signals derived by magnetic read/write heads of a tape deck (not shown to simplify FIG. 1). Signal DE is a series of logic pulses in the binary "PE" code, a code frequently used in magnetic memories. As illustrated by waveform DE, FIG. 2, signal DE contains a succession of bit cells $CB_1$, $CB_2$, $CB_3$, $CB_i$, $CB_{i+1}$, $CB_n$, each having a period $T_O$, so bit cell $CB_1$ lies between times $t_0$ and $t_1$, cell $CB_2$ between times $t_1$ and $t_2$, cell $CB_i$ between times $t_{i-1}$ and $t_i$, and so on. Each bit cell $CB_i$ contains a data bit having a value that is a function of the transition direction of a pulse edge situated in the center of cell $CB_i$, i.e. at time $(t_0+t_1)/2$ in the case of cell $CB_1$, $(t_1+t_2)/2$ in the case of cell $CB_2$, $(t_{i-1}+t_i)/2$ in the case of cell $CB_i$, and so on. Positive and negative going transitions respectively represent binary one and zero values. Hence, for cells $CB_1$, $CB_2$, $CB_4$, $CB_{i+2}$, the data bits all have binary zero values, while cells $CB_3$, $CB_i$, $CB_{i+1}$ have binary one data bit values.

Variable frequency oscillator VFO contains phase comparator $C\phi$ and a voltage controlled oscillator VCO which generates a sampling, clock signal H having a frequency $F_H$ substantially equal to $1/T_O$. Thereby, the frequency of signal H corresponds to the nominal frequency $F_O$ of input signal DE, so each period of signal H corresponds to the period $T_O$ of one cell of signal DE. Phase comparator $C\phi$ compares the frequencies of signals H and DE which are applied to its inputs, to derive a d.c. signal having a voltage amplitude $e=kF_O$, proportional to the frequency $F_O$. The d.c. signal of comparator C is supplied to the frequency control input of voltage controlled oscillator VCO which is a function of voltage e. If the frequency $F_H$ of signal H is greater than the nominal frequency $F_O$ of signal DE, voltage e is reduced, to alter the frequency $F_H$ of signal H in a direction such that finally $F_O \simeq F_H$. Thus, the frequency of the input signal DE and the frequency of clock signal H are both hereafter referred to as $F_O$.

Level transposition circuit TRANSNIV converts input signal DE into a signal DEI which is to be integrated by integrating apparatus DISINTEG. As can be seen from waveform DEI, FIG. 2, the level of signal DEI is normally constant for the entire duration $T_O$ of a bit cell at either a positive or negative level which respectively correspond with binary one and zero cell values. However, if signal DE contains phase distortion, as during cell $CB_{i+1}$, the value of signal DE is subject to change during a cell as described infra. Phase distortion occurs if the transition is not in the center of the bit cell. In other words, for each bit cell, circuit TRANSNIV normally converts a PE coded signal DE into a signal DEI having a bit value that is a function of the transition direction of the DE signal. It is clear that it is easier to detect the value of a bit in response to signal DEI than in response to signal DE.

To convert signal DE into signal DEI, circuit TRANSNIV includes a signal multiplier $M_1$ that responds to signal DE and a fixed amplitude level $(A/\sqrt{T_O})$ to convert signal DE into a signal $M_k$ (waveform $M_k$, FIG. 2) having maximum and minimum amplitudes respectively equal to $A/\sqrt{T_O}$ and $-A/\sqrt{T_O}$, where A is an arbitrary constant. Signal $M_k$ and signal $\phi(t)$, derived by shifting the level of signal H so signal $\phi(t)$ has maximum and minimum amplitudes respectively equal to $+1/\sqrt{T_O}$ and $(-1/\sqrt{T_O})$ are combined in multiplier $M_2$, which derives signal DEI as equal to $(M_k)(\phi(t))$. Integrating apparatus DISINTEG integrates signal DEI during each period $T_O$ of bit cells $CB_i$ to derive the signal $$DEINT = \int_0^T DEI\, dt = \int_0^T M_k \cdot \phi(t) dt.$$

Decision circuit DECID responds to signal DEINT and determines its sign at the end of each integration period $T_O$ of a bit cell $CB_i$, i.e. substantially at time $t_i$. Circuit DEINT derives a logic signal SB which indicates the value of the data bit corresponding to this cell during each of these periods, i.e. between times $t_O$ and $t_1$, $t_1$ and $t_2$, $t_2$ and $t_3$, etc. In response to the signs of signal DEINT being positive and negative, logic signal SB is respectively equal to one and zero. Because the sign of signal DEINT is determined at the end of the integrating period of bit cell $CB_i$ the value signal SB during bit cell i+1 corresponds with the value of signal DE during the preceding bit cell i (see waveforms DE, DEINT and SB, FIG. 2).

Consideration is now given to bit cell $CB_{i+1}$ in FIGS. 2 and 3, FIG. 3 being an enlarged-scale view of part of FIG. 2. It is assumed that cell $CB_{i+1}$ contains two phase distortions or errors, of duration $\Delta t_1$ and $\Delta t_2$. Phase distorted signals DE, $M_k$, $\phi(t)$, DEI, DEINT are shown with dotted lines while an ideal bit cell $CB_{i+1}$ containing no phase distortion has the shape shown with solid lines, similar to the other cells $CB_1$, $CB_2$, $CB_3$, $CB_4$, $CB_i$, $CB_{i+1}$, etc. In the phase distorted cell $CB_{i+1}$ the amplitude of signal DEI changes abruptly from $A/T_0$ to $-A/T_0$ between time intervals $t_i$ and $(t_i+\Delta t_1)$, $t'_i$ and $(t'_i+\Delta t_2)$. As a result, during these two intervals integrated signal DEINT has a negative slope. Hence, at the end of integrating period $T_O$ at time $t_{i+1}$, the amplitude of signal DEINT equals A', which is less than A, the amplitude which DEINT would have reached if signal DE for the bit cell $CB_{i+1}$ had no phase error. However, with prior art techniques, the amplitude A' is sufficient to enable decision device DECID to determine the polarity of signal DEINT and thus the value of the data bit in cell $CB_{i+1}$.

Any phase error in signal DE, which error corresponds to an instantaneous variation in the frequency of signal DE, is converted by integrator DISINTEG into an amplitude change of signal DEINT. In accordance with the present invention, the variation of DEINT as a function of time is used to determine the total phase error ($\Delta t_1 + \Delta t_2$), and thus the variation in the frequency of signal DE, by measuring the amplitude difference (A-A').

Figure 4:
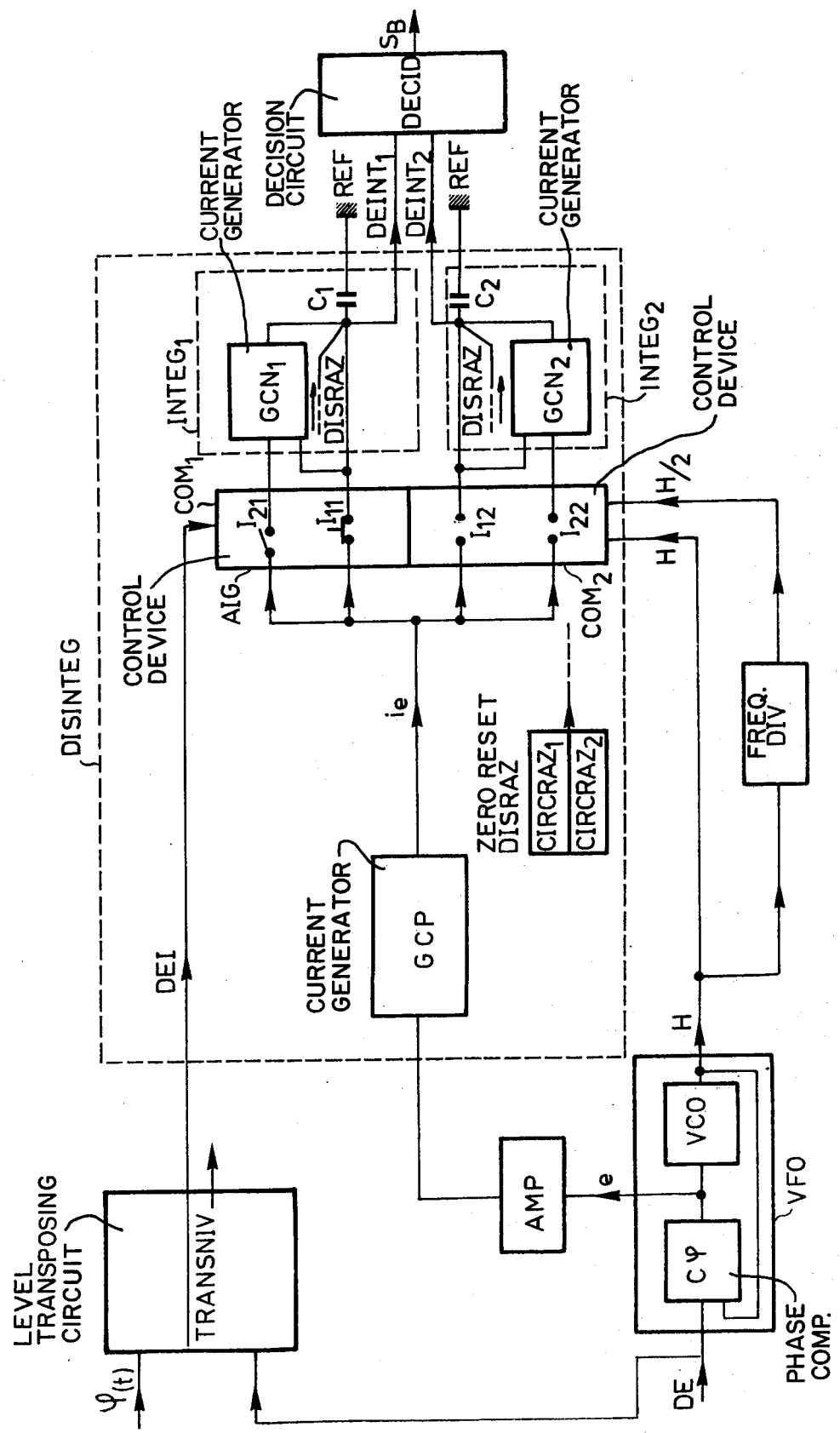
FIG. 4 is a general block diagram of a preferred embodiment of an integrating apparatus according to the invention.

As shown in FIG. 4, the principal parts of a preferred embodiment of the integrating arrangement according to the invention include: a generator GCP which derives a positive current having an amplitude proportional to frequency $F_O$; two, preferably identical, integrators $INTEG_1$ and $INTEG_2$, respectively containing identical capacitive integrating members $C_1$ and $C_2$; a switching circuit AIG formed by two identical control devices $COM_1$ and $COM_2$ which respectively control integrators $INTEG_1$ and $INTEG_2$. Circuit AIG is preferably a multiplexer having two sets of switches ($I_{11}$-$I_{21}$), ($I_{12}$-$I_{22}$) respectively forming control device $COM_1$ and $COM_2$. The integrating arrangement, described in greater detail in the previously mentioned application, also comprises zero reset circuit DISRAZ including two, preferably identical, zero reset circuits $CIRCRAZ_1$ and $CIRCRAZ_2$ that respectively reset integrators $INTEG_1$ and $INTEG_2$ to zero. Generator GCP is supplied by comparator $C\phi$, via an amplifier AMP, with a control voltage e proportional to the frequency $F_O$ of signal DE; generator GCP derives a current $i_e = k_1 F_O$ having an amplitude proportional to frequency $F_O$.

Current $i_e$ is supplied to switching circuit AIG, also responsive to signals H, H/2 and DEI (the signal to be integrated). Signal H/2 is derived by feeding signal H to divide by two frequency divider DIV. Circuit AIG supplies current $i_e$ to capacitive integrating member $C_1$ of integrator $INTEG_1$, via control device $COM_1$, during odd numbered bit cells $CB_1$, $CB_3$, $CB_5$, $CB_k$ where k=2n+1, and k is a whole number; during even numbered bit cells $CB_2$, $CB_4$, $CB_6$, current $i_c$ is supplied to capacitive integrating member $C_2$ of integrator $INTEG_2$, via control device $COM_2$. Thereby, the absolute values of charging currents $i_c$ and $i'_c$ respectively supplied to capacitors $C_1$ and $C_2$ are both virtually equal to $i_e$. The output signals of integrators $INTEG_1$ and $INTEG_2$, respectively derived from the terminals of capacitors $C_1$ and $C_2$, are $DEINT_1$ and $DEINT_2$ (FIG. 2), which are supplied to input terminals of decision circuit DECID that derives a binary NRZ output signal SB, FIG. 2, indicative of the binary data in bit cells $CB_1$, $CB_2$ . . . . Signal DEINT derived by integrating circuit DISINTEG is thus such that $DEINT = DEINT_1$ during the periods of the odd bit cells and such that $DEINT = DEINT_2$ during the periods of the even bit cells. The integrator $INTEG_2$ is reset to zero by zero reset circuit $CIRCRAZ_1$ while integrator $INTEG_1$ is in an integrating operation during odd bit cells; integrator $INTEG_1$ is reset to zero by zero reset circuit $CIRCRAZ_1$ while integrator $INTEG_2$ is in an integrating operation during even bit cells. From FIG. 2, the duration of the zero reset $[(t'_1-t_1), (t'2-t_2), (t'_3-t_3)$, etc.] of each of integrators $DEINT_1$ and $DEINT_2$ is less than $T_O$. As a result, each of integrators $DEINT_1$ and $DEINT_2$ is fully reset to zero before any of its integrating operations begin.

In the previously mentioned application, it is shown that:

(a) signal H/2 controls the integration duration and resetting of integrators $INTEG_1$ and $INTEG_2$; integrators $INTEG_1$ and $INTEG_2$ are respectively reset by zero reset circuits $CIRCRAZ_1$ and $CIRCRAZ_2$ that respond to signal H/2;

(b) signal H defines the integration limits and duration of signal DEI by integrators $INTEG_1$ and $INTEG_2$;

(c) signal DEI determines which of integrated signals $DEINT_1$ and $DEINT_2$ is passed to circuit DECID by controlling the opening and closing of switches $I_{11}$ and $I_{21}$ of control device $COM_1$ on the one hand, and switches $I_{12}$ and $I_{22}$ of the control device $COM_2$ on the other. While integrators $INTEG_1$ and $INTEG_2$ are respectively reset to zero, the switches of the associated control devices $COM_1$ and $COM_2$ are open.

Thus, if integrator $INTEG_1$ is in its integrating phase while DEI is positive, switch $I_{11}$ is closed and switch $I_{21}$ is opened (between times $t_2$ and $t_3$ for example). Integrated signal DEINT is positive, whereby a positive integration and a positive charging current, $I_{c+}$, flows to capacitor $C_1$. If DEI is negative, switch $I_{11}$ is opened and switch $I_{21}$ closed, whereby signal $DEINT_1$ is negative and there is negative integration resulting from a negative charging current $I_{c-}$ for capacitor $C_1$. The same reasoning applies to integrator $INTEG_2$ and capacitor $C_2$, whereby $i_c = i_{c+}$ if DEI is positive $i_c = i_{c-}$ if DEI is negative.

The following table summarizes the operation of the switching arrangement AIG and its four switches $I_{11}$, $I_{21}$, $I_{12}$ and $I_{22}$, and that of the integrators INTEG$_1$ and INTEG$_2$. The convention adopted in the Table uses (1) and (0) to respectively indicate closed and open switch states of the switches; the ratio $i_c/i_e$ respectively equals $\pm 1$ for positive and negative integrations;

| $(i_c/i_e)$ | Switch $I_{11}$ | Switch $I_{21}$ | Switch $I_{12}$ | Switch $I_{22}$ | $(i'_c/i_e)$ |
|---|---|---|---|---|---|
| +1 | 1 | 0 | 0 | 0 | 0 |
| −1 | 0 | 1 | 0 | 0 | 0 |
| 0 | 0 | 0 | 1 | 0 | +1 |
| 0 | 0 | 0 | 0 | 1 | −1 |

The charging currents $I_c$ of capacitors $C_1$ and $C_2$ are such that:

$$\left| \begin{array}{c} i_c \\ i'_c \end{array} \right| = K_1 F_O$$

The voltage, $V_C$, of signal DEINT, across the electrodes of each of capacitors $C_1$ and $C_2$ is, at the end of each integration period $T_O$, $$V_C = \frac{i_c}{C} \times T_O = \frac{1}{C} K_1 T_O \times F_O \text{ with } C =$$

$$C_1 = C_2 = \frac{K}{C} \text{ constant.}$$

Thus, it can be seen that whatever slow variations there are in the frequency $F_O$, and thus in the speed of movement of the magnetic tape on the tape deck, the voltage of the signal coupled to the output terminals of integrators INTEG$_1$ and INTEG$_2$ remains constant (this is not true for instantaneous frequency variations, as described above with reference to FIGS. 2 and 3). The integrating apparatus thus makes it possible to ensure high accuracy for the data bit detecting arrangement according to the invention.

Integrators INTEG$_1$ and INTEG$_2$ respectively contain negative current generators GCN$_1$ and GCN$_2$ associated with the capacitors $C_1$ and $C_2$; construction and operation of the current generators are described in detail in the previously mentioned application.

Figure 5:
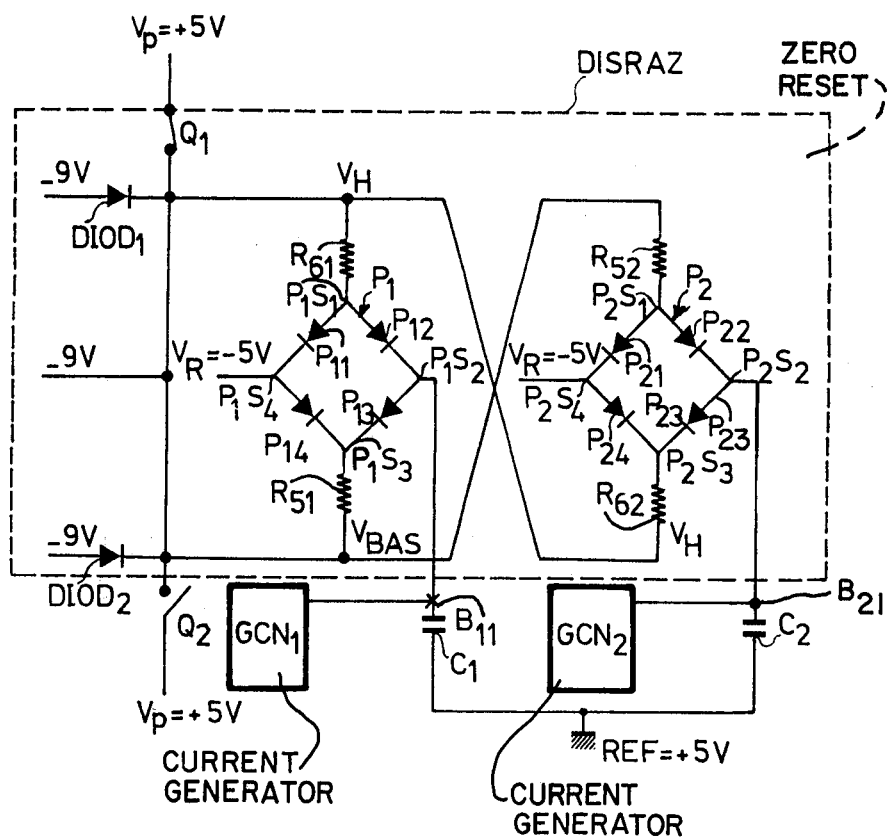
FIG. 5 is a detailed diagram of a zero reset circuit of the integrating apparatus illustrated in FIG. 4.

The zero reset circuit DISRAZ shown in FIG. 5 comprises: first and second, preferably identical, diode bridges P$_1$ and P$_2$ respectively forming zero reset circuits CIRCRAZ$_1$ and CIRCRAZ$_2$ for integrators INTEG$_1$ and INTEG$_2$; diodes DIOD$_1$ and DIOD$_2$; as well as transistor switches Q$_1$ and Q$_2$ which respectively control bridges P$_1$ and P$_2$.

In the described embodiment, the first diode bridge P$_1$ comprises four "Schottky" diodes P$_{11}$, P$_{12}$, P$_{13}$, P$_{14}$, such as diodes of the HP-5082-2013 type manufactured by Hewlett-Packard. Terminals P$_1$ S$_2$ and P$_1$ S$_1$ of bridge P$_1$ are respectively connected to terminal B$_{11}$ of capacitive member C$_1$ and to resistor R$_{61}$, in turn connected to diode DIOD$_1$ and via switch Q$_1$ to a source of positive voltage V$_p$, equal to +5 volts for example. Terminals P$_1$ S$_4$ and P$_1$ S$_3$ are respectively connected to a source of negative voltage V$_R$ (equal to −5 volts, for example) and to resistor R$_{51}$, in turn connected to diode DIOD$_2$ and to the positive voltage source V$_p$ = +5 V by switch Q$_2$.

Diode bridge P$_2$ similarly comprises four Schottky type diodes P$_{21}$ to P$_{24}$. Terminals P$_2$ S$_2$ and P$_2$ S$_4$ are respectively connected to terminal B$_{21}$ of capacitive member C$_2$ and to the negative voltage source V$_R$ = −5 V. Terminal P$_2$ and S$_1$ is connected to diode DIOD$_2$ via a resistor R$_{52}$ and to the source of voltage V$_p$ via switch Q$_2$, while terminal P$_2$ S$_3$ is connected to diode DIOD$_1$ via a resistor R$_{62}$ and to source V$_p$ via switch Q$_1$. The cathodes of diodes DIOD$_1$ and DIOD$_2$ are connected to a source of negative voltage V$_n$ = −9 volts. Resistors R$_{51}$ and R$_{52}$ preferably have identical values, as do R$_{61}$ and R$_{62}$.

The following description is restricted to the operation of the diode bridge P$_1$ which controls the resetting to zero of integrator INTEG$_1$ as illustrated by FIGS. 6A, 6B, 6C; the operation of bridge P$_2$ is identical to that of bridge P$_1$.

In describing the integrating apparatus of the invention, it is assumed that capacitor C$_1$ has returned to its initial, discharged state, whereby voltage V$_{B11}$ is equal to V$_R$, i.e. is equal to −5 V; also assume terminal B$_{12}$ is maintained at a D.C. reference voltage REF, equal to +5 V. The positive and negative charges supplied to capacitor C$_1$ correspond to variations $\Delta V_{B11}$ in the voltage V$_{B11}$, respectively equal to +2 V and −2 V. Thus, after a positive integration, $$V_{B11} = -5 + \Delta V_{B11} = (-5+2) = -3 \text{ V},$$

and after a negative integration $$V_{B11} = (-5-2)V = -7 \text{ V}.$$

As shown in the previously mentioned application, after a positive integration (in the case of zero reset circuit CIRCRAZ$_1$ for example, the same reasoning applying to circuit CIRCRAZ$_2$), diodes P$_{11}$ and P$_{13}$ are unblocked while diodes P$_{12}$ and P$_{14}$ remain blocked, as seen in FIG. 6A. Capacitor C$_1$ discharges through diode P$_{13}$ and resistor P$_{51}$ until the potentials at terminals P$_1$S$_2$ and P$_1$S$_4$ are equal. Capacitor C$_1$ is therefore completely discharged so integrator INTEG$_1$ is fully reset to zero. After a negative integration (FIG. 6C), diodes P$_{11}$ and P$_{13}$ are blocked, while diodes P$_{12}$ and P$_{14}$ are unblocked. Capacitor C$_1$ discharges through diode P$_{12}$ and resistor R$_{61}$ until the potential at terminals P$_1$S$_2$ and P$_1$S$_4$ are identical, to reset integrator INTEG$_1$ to zero. The time constants of the discharge circuits for capacitor C$_1$, for both positive integration (the circuit through C$_1$, diode P$_{13}$, and resistor R$_{51}$) and negative integration (the circuit through C$_1$, diode P$_{12}$, and resistor R$_{61}$) is such that $$(t'_1 - t_1) = (t'_2 - t_2) = (t'_3 - t_3) < T_O.$$

In accordance with a special feature of the invention, decision circuit DECID determines the values of the data bits and the phase error magnitudes in each of the bit cells CB$_i$. The phase error magnitudes are determined by comparing the amplitude A' of signal DEINT at the beginning ($t_i$) of each cell (see FIG. 3) with an arbitrary threshold voltage V$_\epsilon$ equal to a predetermined fraction of the maximum amplitude A, e.g. 0.25 A, 0.3 A, 0.35 A or 0.4 A.

Figure 7:
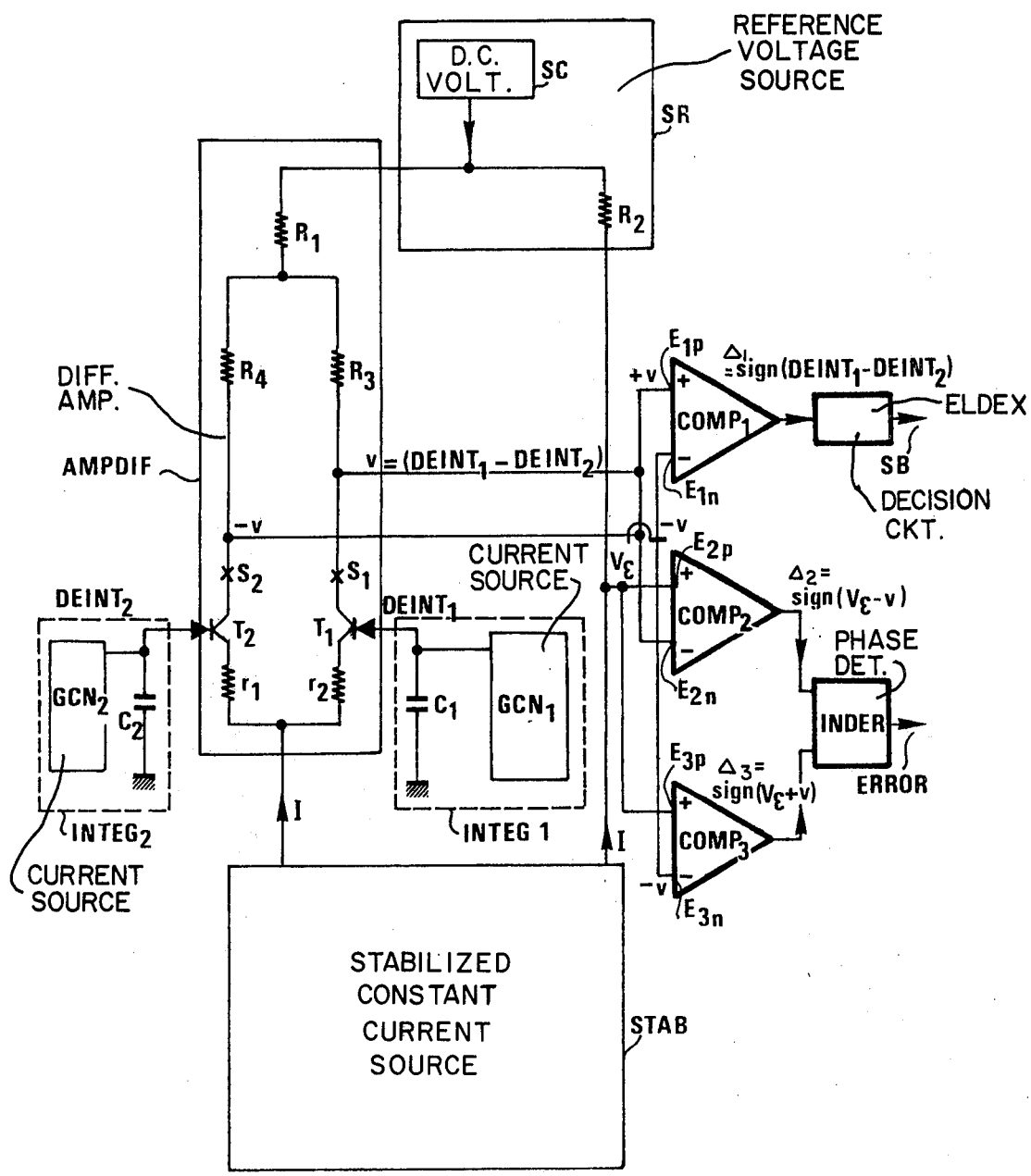
FIG. 7 is a detailed diagram of the decision circuit of the data detecting arrangement according to the invention.

As seen in FIG. 7, decision circuit DECID comprises stabilized current generator STAB which supplies constant DC currents I to differential amplifier AMPDIF and comparators COMP2 and COMP3. Differential amplifier AMPDIF is responsive to signals DEINT$_1$ and DEINT$_2$ respectively derived from integrators INTEG$_1$ and INTEG$_2$, to generate complementary output signals ±v, respectively proportional to I·(DEINT$_1$−DEINT$_2$). Signals +v and −v are respectively applied to non-inverting and inverting inputs of comparator COMP$_1$ which derives a bilevel output ($\Delta_1$) having a binary value commensurate with the polarity of v, whereby $\Delta_1$=sgn (DEINT$_1$−DEINT$_2$). Decision circuit ELDEX responds to signal S to derive waveform SB. The constant current I from source STAB is combined with a DC reference voltage from sources SR; the combined reference current and voltage are supplied to non-inverting input terminals E$_{2p}$ and E$_{3p}$ of comparators COMP2 and COMP3, having inverting input terminals E$_{2n}$ and E$_{3n}$ respectively responsive to differential voltages +v and −v. Comparators COMP2 and COMP3 derive bilevel output signals ($\Delta_2$ and $\Delta_3$) respectively indicative of the polarities of (V$_\epsilon$−v) and (V$_\epsilon$+v); i.e. the output of COMP$_2$=sgn (V$_\epsilon$−DEINT$_1$+DEINT$_2$) and the output of COMP$_3$=sgn (V$_\epsilon$+DEINT$_1$−DEINT$_2$). The outputs of comparators COMP2 and COMP3 are supplied to phase detector INDER which derives an output signal ERROR indicative of the phase error.

Differential amplifier AMPDIF preferably contains identical transistors T$_1$ and T$_2$ having emitters connected via resistors r$_1$ and r$_2$ to be responsive to current I derived from stabilized current generator STAB. The collectors of transistors, T$_1$ and T$_2$ are respectively connected via resistors R$_3$ and R$_4$ to a common resistor R$_1$ and source SC of constant DC voltage V$_1$, preferably equal to +5 volts. Source SC is also connected through resistor R$_2$ to non-inverting terminals E$_{2p}$ and E$_{3p}$ of comparators COMP2 and COMP3 to derive the reference voltage V$_\epsilon$.

Decision circuit DECID operates as follows:

Generator STAB supplies a stabilized DC current I to the emitters of transistors T$_1$ and T$_2$ via resistors r$_1$ and r$_2$. The bases of transistors T$_1$ and T$_2$ respectively respond to signals DEINT$_1$ and DEINT$_2$. Preferably r$_1$=r$_2$ and R$_3$=R$_4$, so amplifier AMPDIF is balanced, whereby at the collector output terminal S$_1$ of transistor T$_1$ is obtained signal v=(DEINT$_1$−DEINT$_2$). From collector output terminal S$_2$ of transistor T$_2$ is obtained signal −v=−(DEINT$_1$−DEINT$_2$).

As indicated supra, signal v is fed to non-inverting input E$_{1n}$ of comparator COMP$_1$ and to inverting input E$_{2n}$ of comparator COMP$_2$, while signal −v is fed to inverting input E$_{1n}$ of comparator COMP$_1$ and to inverting input E$_{3n}$ of comparator COMP$_3$. Reference voltage V$_\epsilon$=(V$_1$−R$_2$I), derived from source SR, is fed to the positive inputs E$_{2p}$ and E$_{3p}$ of comparators COMP$_2$ and COMP$_3$.

The voltage difference between inputs E$_{1p}$ and E$_{1n}$ of comparator COMP$_1$ is equal to v−(−v)=+2 v. From FIG. 2, at the end of each integrating period T$_O$ of bit cells CB$_i$, i.e. at times t$_1$, t$_2$, t$_3$ . . . t$_i$ . . . t$_n$, the polarity of signal v is the same as that of signal DEINT. Comparator COMP$_1$ thus responds to its inputs to derive a constant signal $\Delta_1$, which, at times t$_1$, t$_2$, t$_3$, t$_i$, has the same polarity as signal DEINT. The constant signal $\Delta_1$ is fed to decision circuit DECID, which derives signal SB.

The difference in voltage between inputs E$_{2p}$ and E$_{2n}$ of comparator COMP2 equals (V$_\epsilon$−v), whereas the difference in voltage between inputs E$_{3p}$ and E$_{3n}$ of comparator COMP$_3$ equals (V$_\epsilon$+v). Output signals $\Delta_2$ and $\Delta_3$, respectively derived from comparators COMP$_2$ and COMP$_3$, are constant and of the same polarities (V$_\epsilon$−v) and (V$_\epsilon$+v) respectively. There are two eventualities to be considered in respect of the operation of comparators COMP$_2$ and COMP$_3$, viz:

(A) if v is positive (after positive integration)

$$(V_\epsilon - v) > 0, \text{ or } (V_\epsilon - v) < 0;$$

(1) if (V$_\epsilon$−v)>0, the phase error is considered to be too great and there is said to be an error, (2) if (V$_\epsilon$−v)<0 no error is considered to have occurred. In both cases A(1) and A(2), (V$_\epsilon$+v)>0. If there is too great a phase error, signals $\Delta_2$ and $\Delta_3$ which are fed to the inputs of error indicating circuit INDER (preferably a two input AND gate) are both greater than zero and are considered binary one values, whereby the output signal ERROR emitted by circuit INDER has a binary one value. If there is no error, signals $\Delta_2$ and $\Delta_3$ supplied to the inputs of circuit INDER have opposite polarities, whereby signal ERROR has a binary zero value.

(B) if v is negative (after a negative integration), $$(V_\epsilon + v) > 0, \text{ or } (V_\epsilon + v) < 0;$$

(1) if (V$_\epsilon$+v)>0, v<V$_\epsilon$ and there is a phase error, (2) if (V$_\epsilon$+v)<0, there is no phase error. In both cases, B(1) and B(2), (V$_\epsilon$−v)>0. It can be seen that case B is equivalent to case A. If there is a large phase error, signals $\Delta_2$ and $\Delta_3$ are both positive and the ERROR signal derived from the AND gate in circuit INDER has a binary one value. If there is no error, $\Delta_2$ and $\Delta_3$ have opposite signs, whereby ERROR signal has a binary zero value.

While there has been described and illustrated a specific embodiment of the invention, it will be clear that variations in the details of the embodiment specifically illustrated and described may be made without departing from the true spirit and scope of the invention as defined in the appended claims.

What is claimed is:

1. Apparatus for detecting data in the form of a sequence of electrical signals of frequency F$_0$, comprising a clock circuit responsive to and synchronized by the sequence for deriving a clock signal H of frequency F$_0$, a level transposing device responsive to the sequence and a timing signal synchronized with signal H for deriving a bilevel signal DEI, an integrating apparatus responsive to signal DEI for deriving signal DEINT, a decision circuit responsive to signal DEINT for determining the polarity of signal DEINT and deriving binary data bits having values that are a function of the polarity, said integrating apparatus including at least one integrator having a capacitive integrating member, a device responsive to signal DEI for controlling the direction and duration of charging current supplied to the capacitive member as a function of the polarity and duration of each of the levels of signal DEI, a circuit for resetting the integrator to zero at the end of the integrating operation for each level of signal DEI, and a generator for supplying the capacitive integrating member with a charging currnet proportional to frequency F$_0$.

2. The data detecting system of claim 1 wherein the integrating apparatus includes first and second integrators for respectively deriving output signals DEINT$_1$ and DEINT₂, DEINT₁ and DEINT₂ together comprising signal DEINT, the controlling device comprising switching apparatus connected between an output of the current generator and inputs of the first and second integrators, the circuit for resetting including circuit means for resetting the first and second integrators to zero, the switching apparatus being responsive to the sequence of signals to be integrated and current derived from the current generator so the first integrator is in an integrating operation while the second integrator is reset to zero by the zero reset means, and vice versa.

3. A data detecting apparatus of claim 2 wherein the resetting means includes a separate circuit for resetting each integrator to zero, each of the resetting circuits including a diode bridge and a device for controlling the bridge, a first terminal of the bridge being connected to a first terminal of the capacitive integrating member of the integrator, the capacitive integrating member having a second terminal connected to a source of constant reference voltage, a second terminal of the bridge, opposite from the first bridge terminal being connected to the source of reference voltage, a second pair of opposite bridge terminals being respectively responsive to constant and different value output signal voltages of the control device.

4. The data detecting apparatus of claim 3 wherein the detection circuit includes a differential amplifier having first and second inputs respectively responsive to output signals DEINT₁ and DEINT₂ respectively derived from the first and second integrators for deriving first and second output signals v and −v respectively proportional to (DEINT₁−DEINT₂) and (DEINT₂−DEINT₁), a source of reference voltage $V_{68}$, a first comparator responsive to signals v and −v for deriving a signal indicative of the polarity of v, a decision member responsive to the signal indicative of the polarity of v for deriving data bits having binary values that are a function of the polarity of signal v, second and third comparators both responsive to a reference voltage signal $V_\epsilon$ and respectively responsive to signals +v and −v, a phase-error indicating member responsive to output signals of the second and third comparators for deriving a signal indicative of the amplitude of the integrated signal DEINT at the end of each integrating phase relative to the amplitude of voltage $V_\epsilon$.

5. The data detecting apparatus of claim 2 wherein the detection circuit includes a differential amplifier having first and second inputs respectively responsive to output signals DEINT₁ and DEINT₂ respectively derived from the first and second integrators for deriving first and second output signals v and −v respectively proportional to (DEINT₁−DEINT₂) and (DEINT₂−DEINT₁), a source of reference voltage $V_\epsilon$, a first comparator responsive to signals v and −v for deriving a signal indicative of the polarity of v, a decision member responsive to the signal indicative of the polarity of v for deriving data bits having binary values that are a function of the polarity of signal v, second and third comparators both responsive to a reference voltage signal $V_\epsilon$ and respectively responsive to signals +v and −v, a phase-error indicating member responsive to output signals of the second and third comparators for deriving a signal indicative of the amplitude of the integrated signal DEINT at the end of each integrating phase relative to the amplitude of voltage $V_\epsilon$.

6. Apparatus for detecting the binary value of coded signals having opposite going transitions normally in the center of a bit cell, the direction of the transition determining the binary value of the bit cell, the bit cells being subject to phase distortion causing a shift in the center position of the transition, comprising integrator means including first and second integrators, means responsive to the repetition rate at bit cells of a coded signal for controlling the rate of which a signal to be integrated is accumulated by the integrator means, means responsive to the bit cell period for controlling the integration duration of the integrator means, means responsive to the direction of the center transition of each bit cell for controlling the integration duration of the integrator means, means responsive to the direction of the center transition of each bit cell for controlling the integration direction of the integrator means during each bit cell, means for respectively activating the first and second integrators to accumulate the signal to be integrated during odd and even numbered bit cells, means for respectively resetting the first and second integrators to zero during even and odd numbered bit cells, means responsive to the accumulated signal of the first and second integrators prior to resetting thereof for subtracting the integrated values derived from the integrators during odd and even numbered bit cells to derive a difference signal, and means for detecting the polarity of the difference signal to provide an indication of the bit cell values.

7. The apparatus of claim 6 further including means for comparing the difference signal with a reference signal value to derive a pair of signals indicating the polarities of the reference value relative to the difference signal and a complement of the difference signal, and means responsive to the polarity indicating signals both indicating the same predetermined polarity for indicating the presence of a phase error.

8. Apparatus for detecting the binary value of coded signals having opposite going transitions normally in the center of a bit cell, the direction of the transition determining the binary value of the bit cell, the bit cells being subject to phase distortion causing a shift in the center position of the transition, comprising integrator means including first and second integrators, means responsive to the repetition rate of bit cells of a coded signal for controlling the rate at which a signal to be integrated is accumulated by the integrator means, means responsive to the bit cell period for controlling the integration duration of the integrator means, means responsive to the direction of the center transition of each bit cell for controlling the integration direction of the integrator means during each bit cell, means for respectively activating the first and second integrators to accumulate the signal to be integrated during odd and even numbered bit cells, means for respectively resetting the first and second integrators to zero during even and odd numbered bit cells, means responsive to the accumulated signal of the first and second integrators prior to resetting thereof for subtracting the integrated values derived from the integrators during odd and even numbered bit cells to derive a difference signal, means for comparing the difference signal with a reference signal value to derive a pair of signals indicating the polarities of the reference value relative to the difference signal and a complement of the difference signal, and means responsive to the polarity indicating signals both indicating the same predetermined polarity for indicating the presence of a phase error.

9. Apparatus for detecting the binary value of coded signals having opposite going transitions normally in the center of a bit cell, the direction of the transition determining the binary value of the bit cell, the bit cells being subject to phase distortion causing a shift in the center position of the transition, comprising integrator means including first and second integrators, means responsive to the bit cell period for controlling the integration duration of the integrator means, means responsive to the direction of the center transition of each bit cell for controlling the integration direction of the integrator means during each bit cell, means for respectively activating the first and second integrators to accumulate the signal to be integrated during odd and even numbered bit cells, means for respectively resetting the first and second integrators to zero during even and odd numered bit cells, means responsive to the accumulated signal of the first and second integrators prior to resetting thereof for subtracting the integrated values derived from the interators during odd and even numbered bit cells to derive a difference signal, means for comparing the difference signal with a reference signal value to derive a pair of signals indicating the polarities of the reference value relative to the difference signal and a complement of the difference signal, and means responsive to the polarity indicating signals both indicating the same predetermined polarity for indicating the presence of a phase error.

10. A data detecting apparatus of claim 1 wherein the resetting means includes a separate circuit for resetting each integrator to zero, each of the resetting circuits including a diode bridge and a device for controlling the bridge, a first terminal of the bridge being connected to a first terminal of the capacitive integrating member of the integrator, the capacitive integrating member having a second terminal connected to a source of constant reference voltage, a second terminal of the bridge, opposite from the bridge terminal being connected to the source of reference voltage, a second pair of opposite bridge terminals being respectively responsive to constant and different value output signal voltages of the control device.

* * * * *